Patented Sept. 14, 1954

2,689,240

UNITED STATES PATENT OFFICE 2,689,240

COPOLYMER OF CYCLOPENTADIENE AND VINYL ACETATE

Howard Leon Gerhart, Milwaukee, Wis., assignor to Pittsburgh Plate Glass Company, Pittsburgh, Pa., a corporation No Drawing. Application May 9, 1952,
Serial No. 287,043

3 Claims. (Cl. 260—83.5)

This invention relates to addition products of vinyl acetate and cyclopentadiene, or the lower homopolymers of the latter and it has particular relation to addition products of the foregoing materials which are of a resinous or gum-like consistency and which are soluble in or compatible with vegetable oils, nitrocellulose, and other media.

It has heretofore been proposed to prepare addition products or polymers of cyclopentadiene by treating the latter under appropriate conditions to form homopolymers. In general the materials so prepared were insoluble products of but little use in the coating industry.

It has also been suggested to copolymerize cyclopentadiene and the lower homopolymers thereof with unsaturated glyceride oil such as linseed oil, soya bean oil and the like in order to form soluble solid resins and liquid or semi-liquid products having air drying characteristics and being of exceptional value as coating media. This reaction has usually been effected by heating up the mixture of oil and cyclopentadiene simultaneously. It was impracticable to polymerize cyclopentadiene and then to add it to oil because polymerized cyclopentadiene tended to become insoluble in glyceride oils and many of the solvents common in the coating industry.

The present invention includes the discovery that vinyl acetate and cyclopentadiene or the lower homopolymers thereof, for example, the dimer, trimer, or tetramer can successfully be reacted by addition to form gum or resin like bodies which can readily be cooked in a separate operation into glyceride oils or dissolved in various solvents of the paint and lacquer industry to provide vehicles that can be spread as films upon surfaces of wood or metal. The films will dry by evaporation of the solvent and/or by air oxidation of the double bonds to provide hard and resistant films. In this manner it is possible to provide a coating medium or vehicle which comprises an unsaturated glyceride oil component and which will dry to a hard tack free state exceptionally rapidly. Drying can be accelerated by the conventional siccatives of the paint and varnish industry and being represented by the oleates, linoleates, naphthenates, and similar soluble compounds of drier metals such as lead, chromium, manganese, cobalt, and others. They may be employed in approximately the same proportions as in conventional coating compositions.

In the preparation of gum-like or resinous addition products of cyclopentadiene in accordance with the provisions of the present invention, either cyclopentadiene per se or the lower homopolymers thereof such as the dimer, trimer, or tetramer may be employed as starting materials. The lower homopolymers it will be understood under the conditions of reaction, e. g., under heat of reaction and pressure in an autoclave, as comtemplated in this invention tend to crack or split to form monomeric cyclopentadiene which can then readily undergo addition reaction with vinyl acetate to form a resinous or gum-like copolymer. In general the term "cyclopentadiene" as herein employed includes its lower homopolymers.

Vinyl acetate suitable for use in the reaction, preferably is reacted while it is in the monomeric state. In any event it is employed in such low state of polymerization as to be a liquid which under the conditions of reaction is reactive with and compatible with cyclopentadiene, or the lower homopolymers thereof as herein before described.

The reaction can be effected upon mixtures consisting essentially of the cyclopentadiene or its lower homopolymers such as dicyclopentadiene and vinyl acetate, in the absence of non-reactive solvents or diluents; however, the invention also includes the addition of such diluents, e. g., xylene or toluene to the reaction mixture in practically any proportion from zero to any amount which it is practicable to employ without unduly restricting the output of the apparatus used in the reaction.

In most instances it will be found convenient to employ cyclopentadiene in a proportion such that it constitutes approximately 44 to 95 per cent by weight of the copolymerizable mixture of cyclopentadiene (or homopolymer thereof) and vinyl acetate the latter of course, constitutes 5 to 56 per cent by weight of the mixtures. Over most of, if not all of this entire range, it is possible by a proper regulation of temperatures and periods of reaction to obtain products which are readily soluble in glyceride oils and notably in such drying oils as linseed oil, soya bean oil, tung oil, or the like.

The reaction, preferably, is conducted in the absence of catalysts, but use of catalysts such as boron trifluoride, aluminum trichloride, tin tetrachloride, and other proton or Friedel-Crafts catalysts is included.

The reaction is conducted at a temperature which under the conditions of reaction is adequately high to insure formation of a large amount of soluble resin or gum-like product as controdistincted from a Diels-Alder product embodying a single endomethylene six side ring of the type

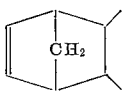

Usually the temperature is within the range of 329° to 575° F. Obviously the temperature will increase gradually as the reaction mixture is heated. Usually the reaction starts at a value of about 329° F. or near the cracking temperature of dicyclopentadiene.

Within the temperature range of approximately 390° to 575° F. the reaction proceeds quite readily to form valuable polymer products which are within the scope of the present invention.

Since cyclopentadiene and vinyl acetate are relatively volatile materials, it is usually difficult to heat a mixture thereof to reaction temperature without resort to the use of some embodiment of pressure apparatus. Therefore, the reaction is most commonly conducted in an autoclave or a bomb or some similar device in which the reaction mixture can be heated to temperatures within foregoing ranges without undue volatilization and loss of one or more of the reactants. An autoclave of stainless steel, iron, or other material of satisfactory mechanical strength is quite suitable for the reaction. It is desirable that the autoclave be equipped with a pressure gauge and a thermocouple by means of which the course of the reaction can be followed. It is also desirable that it be provided with a cock or other mechanism whereby samples may be drawn off at intervals, for purposes of viscosity, iodine value, or other tests designed to indicate when the desired consistency of the product has been attained.

The drop of the pressure of reaction is a good criterion of completion of the reaction. When this tends to fall even with increase of temperature the product is substantially complete.

Any unreacted constituents or volatile constituents can be removed by vaporization at the conclusion of the reaction period, to leave a resin or a gum-like product. Obviously, liquid products can be obtained and employed if so desired. The term resin or gum includes such liquid materials.

It is convenient if the autoclave is mounted upon a shaking or rocking device or is provided with other means of agitation. It should also be equipped with heating means such as electrical coils by means of which the reaction mixture can be brought to the necessary temperature to effect copolymerization.

In the reaction, the pressures (pyrogenetic pressures or vapor pressures of the reactants) generated by the reactants, normally constitute the source of pressure. However, additional hydrostatic pressure of practically any intensity which can be attained may also be applied, but is not required in the reaction. The autoclave or bomb above described may be replaced by an elongated heated tube through which the reactants can be conducted continuously or periodically to form resinous products.

The reaction will normally be completed within a period of one half to twenty-four hours dependent upon the temperature of reaction, the hardness of the desired product and such like factors. A period of reaction extending from 1 to 6 hours is deemed to be especially favorable. The reaction preferably is continued until samples when drawn off and cooled assume a resinous or gum-like character.

The products of copolymerization of cyclopentadiene (or its lower homopolymers) and vinyl acetate prepared as above described, are soluble in glyceride oil such as linseed oil, soya bean oil and the like. Likewise they are soluble in hydrocarbon solvents such as xylene, toluene, petroleum naphtha and others. Likewise, they are soluble in lacquer solvents. The copolymers of mixtures of 25 to 56 per cent of vinyl acetate and 44 to 75 per cent of cyclopentadiene are also compatible with nitro-cellulose and can be employed as modifying agents in nitro-cellulose lacquers.

The conditions involved in preparing the glyceride oil soluble materials herein disclosed may be summarized as follows:

*Hydrocarbon component.*—Cyclopentadiene or a lower homopolymer capable of forming cyclopentadiene.

*Ester component.*—Vinyl acetate.

*Solvents.*—Permissible but not required, may be impurities, xylene, toluene, etc.

*Catalysts.*—Not preferred, but permissible, may be of Friedel-Crafts type.

*Proportions.*—Five to 56 per cent by weight of vinyl acetate in reaction mixture, preferably at least 2 moles of cyclopentadiene or its equivalent of lower homopolymer per mole of vinyl acetate is employed.

*Apparatus.*—Pressure type, e. g., autoclave or elongated heated tube.

*Pressures.*—Preferably superatomospheric sufficient to confine the reactants or above.

*Temperatures.*—329°–575° F. or 390°–575° F. insufficient to char the reaction mixture.

*Time of reaction.*—One half to 24 hours, preferably, 1 to 6 hours, or until desired viscosity is attained.

*Properties of product.*—A glyceride oil or hydrocarbon soluble product; some are compatible with nitro-cellulose. Drying oils containing them air dry at a rapid rate.

The principles of the invention are illustrated by the following examples:

*Example I*

A mixture of 20 parts by weight of vinyl acetate and 80 parts by weight of dicyclopentadiene were copolymerized in a pressure autoclave as described above. The reaction temperature of 270°–300° C. was maintained for three hours. During that time, a pressure of 103 pounds per square inch was developed. A brittle gum was obtained, having a softening point of 140° C. It was soluble in naphtha or xylol and in drying oils, e. g., linseed oil, to provide paint, lacquer and varnish formulations.

*Example II*

One part vinyl acetate and 2.3 parts cyclopentadiene were heated in an autoclave at a temperature schedule which gradually increased from 180° to 270° C. during 6 hours. A very light colored soft resin with a sweet odor and soluble in hydrocarbons was formed. The product was submitted to distillation at reduced pressure.

The first fraction was removed at 95° to 160° C. at 15 mm. pressure, the second fraction at 160°–175° C. The residue from such distillation is a hard gum which is very soluble in vegetable oils and has remarkable drying properties. The gum or resin can be cooked into linseed oils, soya bean oil, or the like to provide coating vehicles of excellent qualities.

*Example III*

In this reaction, a pressure bomb equipped with a pressure gauge, a thermocouple and an appropriate heating device was charged with 240 grams of vinyl acetate and 560 grams of dicyclopentadiene. The bomb was closed and the heat was applied to obtain the following time-pressure schedule:

[Time of start of heating 8:55; pressure, atmospheric]

| Time | Pounds Per Square Inch Pressure | Thermocouple Iron-Constantan |
|---|---|---|
| 9:25 a. m. | 90 | 8.7 |
| 9:30 a. m. | 102 | 9.1 |
| 9:45 a. m. | 107 | 9.3 |
| 10:00 a. m. | 124 | 9.8 |
| 10:07 a. m. | 130 | 10.0 |
| 10:45 a. m. | 123 | 10.4 |
| 10:50 a. m. | 119 | 10.4 |
| 11:05 a. m. | 126 | 10.9 |
| 11:20 a. m. | 125 | 11.6 |
| 11:25 a. m. | 118 | 11.8 |
| 11:35 a. m. | 102 | 11.7 |
| 11:45 a. m. | 96 | 11.9 |
| 12:10 p. m. | 92 | 12.5 |
| 1:00 p. m. | 75 | 13.3 |
| 1:15 p. m. | 70 | 13.2 |
| 1:30 p. m. | 85 | 13.8 |
| 1:55 p. m. | 91 | 14.1 |
| 2:45 p. m. | 89 | 14.3 |
| 3:50 p. m. | 81 | 14.0 |

The pressures are those of reaction.

The actual temperatures were within the approximate ranges of 180° to 270° C.

The product as obtained was of good color and had a sweet odor. It was cooled down and was soluble in glyceride oils such as linseed oil, soya bean oil, tung oil, and the like.

*Example IV*

A mixture comprising:

| | grams |
|---|---|
| Dicyclopentadiene | 680 |
| Vinyl acetate | 120 | was introduced into an autoclave as in Example I. The mixture was heated up and the pressure was allowed to rise autogenetically until a soluble resin or gum is formed.

*Example V*

A mixture of:

| | grams |
|---|---|
| Vinyl acetate | 480 |
| Dicyclopentadiene | 396 | was heated in an autoclave to attain addition reaction.

*Example VI*

A mixture of:

| | grams |
|---|---|
| Vinyl acetate | 123 |
| Dicyclopentadiene | 280 | was heated in an autoclave to obtain an addition product.

The resultant resinous products as obtained by proper application of the principles of the invention are soluble in xylol, naphtha and drying oils. The resins obtained by copolymerizing cyclopentadiene or a lower homopolymer thereof and ethylenic esters as herein disclosed may be cooked into or reacted with glyceride drying oil under superatmospheric pressure, if so desired. However, it is an advantage of the present invention that the cyclopentadiene-ethylenic ester copolymer, when prepared in accordance with the provisions of the present invention can be introduced into a drying oil, by solution and/or reaction at atmospheric pressure. For example, the resin can be prepared in a small pressure apparatus and the product can be employed to modify a large volume of oil in an ordinary open kettle. Substantial savings in apparatus are thus attained. Also, the resin can be prepared and stored or shipped at will in relatively small bulk. The user can then employ the resin to modify drying without the use of special apparatus.

This application is a continuation-in-part of copending application, Serial No. 241,496, filed August 11, 1951, which is in turn a continuation-in-part of copending applications, Serial No. 470,093, filed December 24, 1942, and Serial No. 568,554, filed December 16, 1944.

I claim:

1. As a new composition of matter, a resinous copolymer composed of cyclopentadiene and vinyl acetate containing from about 5 to 56 per cent of vinyl acetate.

2. A process for copolymerizing cyclopentadiene and vinyl acetate which comprises heating a mixture of cyclopentadiene and vinyl acetate containing from about 5 to about 56 per cent of vinyl acetate and the balance cyclopentadiene at a temperature of from about 390° F. to about 575° F. for a period of from about one-half hour to about twenty-four hours.

3. A process for producing a new resinous composition of matter which comprises thermally copolymerizing a mixture of about 44 per cent to 95 per cent cyclopentadiene and about 5 per cent to 56 per cent vinyl acetate in a reaction zone at a temperature of from about 390° F. to about 575° F., while introducing the cyclopentadiene to said reaction zone in the form of a cyclic diene Diels-Alder polymer thereof.

References Cited in the file of this patent

UNITED STATES PATENTS

| Number | Name | Date |
|---|---|---|
| 2,559,790 | Peters | July 10, 1951 |